United States Patent
He et al.

(10) Patent No.: US 12,188,883 B2
(45) Date of Patent: Jan. 7, 2025

(54) X-RAY REFLECTOMETRY APPARATUS AND METHOD THEREOF FOR MEASURING THREE DIMENSIONAL NANOSTRUCTURES ON FLAT SUBSTRATE

(71) Applicant: INDUSTRIAL TECHNOLOGY RESEARCH INSTITUTE, Hsinchu (TW)

(72) Inventors: Bo-Ching He, Hsinchu (TW); Chun-Ting Liu, Taichung (TW); Wei-En Fu, Yangmei (TW); Wen-Li Wu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 226 days.

(21) Appl. No.: 17/994,858

(22) Filed: Nov. 28, 2022

(65) Prior Publication Data
US 2024/0094148 A1 Mar. 21, 2024

(30) Foreign Application Priority Data
Sep. 13, 2022 (TW) .................................. 111134541

(51) Int. Cl.
G01N 23/20008 (2018.01)
G01B 15/04 (2006.01)
(52) U.S. Cl.
CPC ....... *G01N 23/20008* (2013.01); *G01B 15/04* (2013.01); *G01N 2223/052* (2013.01); *G01N 2223/3303* (2013.01)
(58) Field of Classification Search
CPC ........... G01N 23/20008; G01N 23/207; G01N 2223/052; G01N 2223/3303; G01B 15/04
See application file for complete search history.

(56) References Cited

U.S. PATENT DOCUMENTS

| 6,771,735 B2 | 8/2004 | Janik et al. |
| 6,987,832 B2 | 1/2006 | Koppel et al. |

(Continued)

FOREIGN PATENT DOCUMENTS

| CN | 104081193 B | 9/2017 |
| CN | 110036284 A | 7/2019 |

(Continued)

OTHER PUBLICATIONS

Taiwanese Office Action and Search Report for Taiwanese Application No. 112119892, dated Oct. 23, 2023.
(Continued)

*Primary Examiner* — Jurie Yun
(74) *Attorney, Agent, or Firm* — Birch, Stewart, Kolasch & Birch, LLP

(57) ABSTRACT

This disclosure relates to an X-ray reflectometry apparatus and a method for measuring a three-dimensional nanostructure on a flat substrate. The X-ray reflectometry apparatus comprises an X-ray source, an X-ray reflector, a 2-dimensional X-ray detector, and a two-axis moving device. The X-ray source is for emitting X-ray. The X-ray reflector is configured for reflecting the X-ray onto a sample surface. The 2-dimensional X-ray detector is configured to collect a reflecting X-ray signal from the sample surface. The two-axis moving device is configured to control two-axis directions of the 2-dimensional X-ray detector to move on at least one of x-axis and z-axis with a formula concerning an incident angle of the X-ray with respect to the sample surface for collecting the reflecting X-ray signal.

28 Claims, 5 Drawing Sheets

(56) References Cited

U.S. PATENT DOCUMENTS

| | | |
|---|---|---|
| 7,139,365 B1 | 11/2006 | Janik |
| 7,558,371 B2 | 7/2009 | Park et al. |
| 8,731,138 B2 | 5/2014 | Yokhin et al. |
| 9,588,066 B2 | 3/2017 | Pois et al. |
| 9,823,203 B2 | 11/2017 | Yun et al. |
| 10,119,925 B2 | 11/2018 | Pois et al. |
| 10,151,713 B2 | 12/2018 | Wu et al. |
| 11,036,898 B2 | 6/2021 | Chouaib et al. |
| 11,181,489 B2 | 11/2021 | Thompson et al. |
| 11,333,621 B2 | 5/2022 | Wack et al. |
| 11,460,418 B2 | 10/2022 | Kuznetsov et al. |
| 11,519,719 B2 | 12/2022 | Shchegrov et al. |
| 11,579,099 B2 | 2/2023 | Liv et al. |
| 2003/0086533 A1 | 5/2003 | Janik et al. |
| 2005/0195941 A1 | 9/2005 | Lischka et al. |
| 2012/0140889 A1 | 6/2012 | Wall et al. |
| 2015/0204802 A1 | 7/2015 | Pois et al. |
| 2016/0077025 A1 | 3/2016 | Zhang et al. |
| 2016/0178540 A1 | 6/2016 | Yun et al. |
| 2016/0341674 A1 | 11/2016 | Wu et al. |
| 2017/0167862 A1 | 6/2017 | Dziura et al. |
| 2017/0176354 A1 | 6/2017 | Pois et al. |
| 2017/0307548 A1 | 10/2017 | Bykanov et al. |
| 2017/0315055 A1 | 11/2017 | Tinnemans et al. |
| 2018/0106735 A1 | 4/2018 | Gellineau et al. |
| 2018/0188192 A1 | 7/2018 | Artemiev et al. |
| 2018/0299259 A1 | 10/2018 | Shchegrov et al. |
| 2018/0350699 A1 | 12/2018 | Gellineau et al. |
| 2019/0017946 A1 | 1/2019 | Wack et al. |
| 2019/0286787 A1 | 9/2019 | Chouaib et al. |
| 2020/0225151 A1 | 7/2020 | Wang et al. |
| 2021/0063329 A1 | 3/2021 | Kuznetsov et al. |
| 2021/0109042 A1 | 4/2021 | Liu et al. |
| 2021/0239629 A1 | 8/2021 | Chuang et al. |
| 2021/0310968 A1 | 10/2021 | Kuznetsov et al. |
| 2022/0120561 A1 | 4/2022 | Liu et al. |
| 2022/0252395 A1 | 8/2022 | Hench et al. |

FOREIGN PATENT DOCUMENTS

| | | |
|---|---|---|
| EP | 2 443 651 B1 | 8/2015 |
| FR | 2 180 647 A1 | 11/1973 |
| JP | 2012-13659 A | 1/2012 |
| JP | 5504502 B2 | 5/2014 |
| TW | 201011278 A | 3/2010 |
| TW | I444589 B | 7/2014 |
| TW | 201602514 A | 1/2016 |
| TW | 201917348 A | 5/2019 |
| TW | I660154 B | 5/2019 |
| TW | 201946175 A | 12/2019 |
| TW | 1689702 B | 4/2020 |
| TW | 202124941 A | 7/2021 |
| TW | 202203281 A | 1/2022 |
| TW | I753490 B | 1/2022 |
| WO | WO 2017/203406 A1 | 11/2017 |

OTHER PUBLICATIONS

Gin et al., "Inline metrology of high aspect ratio hole tilt using small-angle x-ray scattering," Proceedings of SPIE, vol. 12053, 2022, 11 pages total:.

U.S. Office Action for U.S. Appl. No. 17/037,115, dated Jul. 14, 2022.

U.S. Office Action for U.S. Appl. No. 17/532,767, dated May 18, 2023.

Voegeli et al., "A quick convergent-beam laboratory X-ray reflectometer using a simultaneous multiple-angle dispersive geometry," Journal of Applied Crystallography, vol. 50, 2017, pp. 570-575.

Freychet et al., "Estimation of Line Cross Sections Using Critical-Dimension Grazing-Incidence Small-Angle X-Ray Scattering", Physical Review Applied, vol. 12, No. 4, 2019, pp. 044026-1-044026-8.

Lee et al., "Nanoimprint pattern transfer quality from specular x-ray reflectivity", Applied Physics Letters, vol. 87, No. 26, 2005, pp. 263111-1-263111-3.

Lee et al., "X-ray Reflectivity Measurements of Nanoscale Structures: Limits of the Effective Medium Approximation", American Institute of Physics Conference Proceedings, vol. 931, No. 209, 2007, pp. 209-215.

Leng et al., "Rapid X-Ray Reflectivity (XRR) characterization and Process Monitoring of Multilayer $Ta/Al_2O_3/Ta/SiO_2/Si$", Proceedings of SPIE, vol. 4449, 2001, pp. 244-252.

Taiwanese Office Action and Search Report for Taiwanese Application No. 111134541, dated Feb. 16, 2023.

X-RAY REFLECTOMETRY APPARATUS AND METHOD THEREOF FOR MEASURING THREE DIMENSIONAL NANOSTRUCTURES ON FLAT SUBSTRATE

This application claims the benefit of Taiwan application Serial No. 111134541, filed Sep. 13, 2022, the subject matter of which is incorporated herein by reference.

TECHNICAL FIELD

The disclosure relates in general to measuring device, and more particularly to an X-ray reflectometry (XRR) apparatus and a method thereof for measuring three dimensional nanostructures on a flat substrate.

BACKGROUND

X-ray reflectometry (XRR) is a powerful technique to investigate surfaces and interfaces including their roughness, diffuseness across buried layers and thickness of single layer and multilayer stacks by depth profiling the electron density in the direction normal to the sample surface with a sub-nanometer resolution. It has also been shown that XRR is capable of quantifying the cross section profile of surface patterns, for example, the cross section of line gratings fabricated by nanoimprint as well as the molds used to imprint the patterns.

SUMMARY

According to one embodiment, an X-ray reflectometry (XRR) apparatus for measuring three dimensional nanostructures on a flat substrate is provided. The X-ray reflectometry apparatus comprises an X-ray source, an X-ray reflector, a 2-dimensional X-ray detector, and a two-axis moving device. The X-ray source is for emitting X-ray. The X-ray reflector is configured for reflecting the X-ray onto a sample surface. The 2-dimensional X-ray detector is configured to collect a reflecting X-ray signal from the sample surface. The two-axis moving device is configured to control two-axis directions of the 2-dimensional X-ray detector to move on at least one of x-axis and z-axis with a formula concerning an incident angle of the X-ray with respect to the sample surface for collecting the reflecting X-ray signal.

According to another embodiment, a method for an X-ray reflectometry (XRR) apparatus to measure three dimensional nanostructures on a flat substrate is provided. The method comprises the following steps. X-ray is emitted by an X-ray source. The X-ray is reflected onto a sample surface by an X-ray reflector. A reflecting X-ray signal from the sample surface is collected by a 2-dimensional X-ray detector. Two-axis directions of the 2-dimensional X-ray detector are controlled by a two-axis moving device to move on at least one of x-axis and z-axis with a formula concerning an incident angle of the X-ray with respect to the sample surface for collecting the reflecting X-ray signal.

Figure 1:
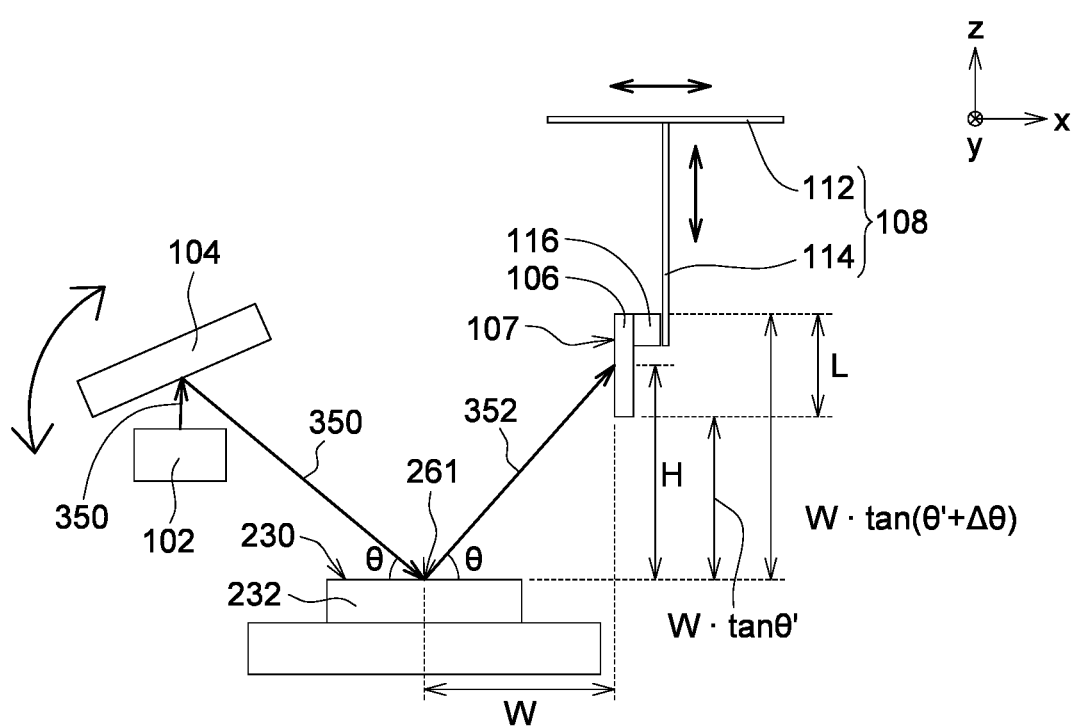
FIG. 1 illustrates an X-ray reflectometry apparatus and a method for measuring a three-dimensional nanostructure on a flat substrate according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Details are given in the non-limiting embodiments below. It should be noted that the embodiments are illustrative examples and are not to be construed as limitations to the claimed scope of the present disclosure. The same/similar denotations are used to represent the same/similar components in the description below. Directional terms such as x-axis, y-axis, z-axis are used in the following embodiments to indicate the directions of the accompanying drawings, not for limiting the present invention.

FIG. 1 illustrates an X-ray reflectometry apparatus and a method for measuring a three-dimensional nanostructure on a flat substrate according to an embodiment. The X-ray reflectometry apparatus comprises an X-ray source 102, an X-ray reflector 104, a 2-dimensional X-ray detector 106 and a two-axis moving device 108. The X-ray source 102 is used for emitting X-ray 350. The X-ray reflector 104 is configured for reflecting the X-ray 350 from the X-ray source 102 onto a sample surface 230 of the sample 232 disposed on a platform. The sample 232 is for example, a semiconductor substrate. The measuring method can be used to measure nano semiconductor structures such as a line width, a line pitch, etc. of the sample surface 230 of the sample 232. The wavelength of the X-ray 350 is no more than twice of a characteristic length along the surface normal of a structure of the sample 232. The characteristic length is selected from the group consisting of film thicknesses of the surface and heights of a nanostructure of the sample surface 230 of the sample 232. The X-ray source 102 may be used to emit the X-ray of one wavelength in a multi-wavelength range of 0.154 nm-20 nm. In an embodiment, the X-ray source 102 includes a fine focused aluminum anode. The X-ray reflector 104 can be for point focusing the X-ray 350 onto the sample surface 230. The X-ray reflector 104 may be selected from a group consisting of single crystal monochromators and multilayer mirrors. For a multilayer mirror type, the wavelength dispersion of the X-ray reflector 104 is less than 0.01. The 2-dimensional X-ray detector 106 is configured to collect a reflecting X-ray signal 352 from the sample surface 230. The incident angle of the X-ray 350 with respect to the sample surface 230 is equal to the exit angle of the reflecting X-ray signal 352 with respect to the sample surface 230. The 2-dimensional X-ray detector 106 may include a 2-dimensional X-ray sensor in a vacuum chamber and an analyzer outside the vacuum chamber, and the sensor size of the 2-dimensional X-ray sensor can collect the reflecting X-ray signal 352 completely. The 2-dimensional X-ray detector 106 has a fine pixel resolution for collecting the reflecting X-ray signal 352 (such as X-ray reflected by the sample surface 230).

The two-axis moving device 108 is configured to control two-axis directions of the 2-dimensional X-ray detector 106 to move on at least one of x-axis and z-axis with a formula concerning an incident angle of the X-ray 350 with respect to the sample surface 230 for collecting the reflecting X-ray signal 352.

The two-axis moving device 108 comprises an x-axis moving device 112 and a z-axis moving device 114. The z-axis moving device 114 is coupled between the 2-dimensional X-ray detector 106 and the x-axis moving device 112. The x-axis moving device 112 is configured to control the 2-dimensional X-ray detector 106 to move on the x-axis with a formula concerning the incident angle of the X-ray 350 with respect to the sample surface 230 for collecting the reflecting X-ray signal 352. The z-axis moving device 114 is configured to control the 2-dimensional X-ray detector 106 to move on the z-axis with a formula concerning the incident angle of the X-ray 350 with respect to the sample surface 230 for collecting the reflecting X-ray signal 352.

A rotating device 116 may be coupled between the z-axis moving device 114 and the 2-dimensional X-ray detector 106. The rotating device 116 may be configured for rotating the 2-dimensional X-ray detector 106 in x-z plane. In other words, the rotating device 116 may be configured for rotating the 2-dimensional X-ray detector 106 along the y-axis.

When the incident angle θ of the X-ray 350 with respect to the sample surface 230 is set as a range from θ' to θ'+Δθ, the x-axis moving device 112 of the two-axis moving device 108 controls the 2-dimensional X-ray detector 106 to move on the x-axis with a formula of $$W < \frac{L}{\tan(\theta' + \Delta\theta) - \tan\theta'},$$

and at the same time the z-axis moving device 114 of the two-axis moving device 108 controls the 2-dimensional X-ray detector 106 to move on the z-axis with a formula of H=W·tan θ'+L/2, such that the reflecting X-ray signal 352 can be completely collected by the 2-dimensional X-ray detector 106 in the case of the incident angle θ being the range from θ' to θ'+Δθ without moving the two-axis moving device 108. Δθ represents the amount of change in the incident angle.

In the present disclosure, W is a distance between a X ray-reflection point 261 on the sample surface 230 and a surface 107 of the 2-dimensional X-ray detector 106 along the x-axis. L is a size (e.g. height) of the 2-dimensional X-ray detector 106 along the z-axis. H is a distance between the sample surface 230 and the center of the 2-dimensional X-ray detector 106 along the z-axis.

Figure 2A:
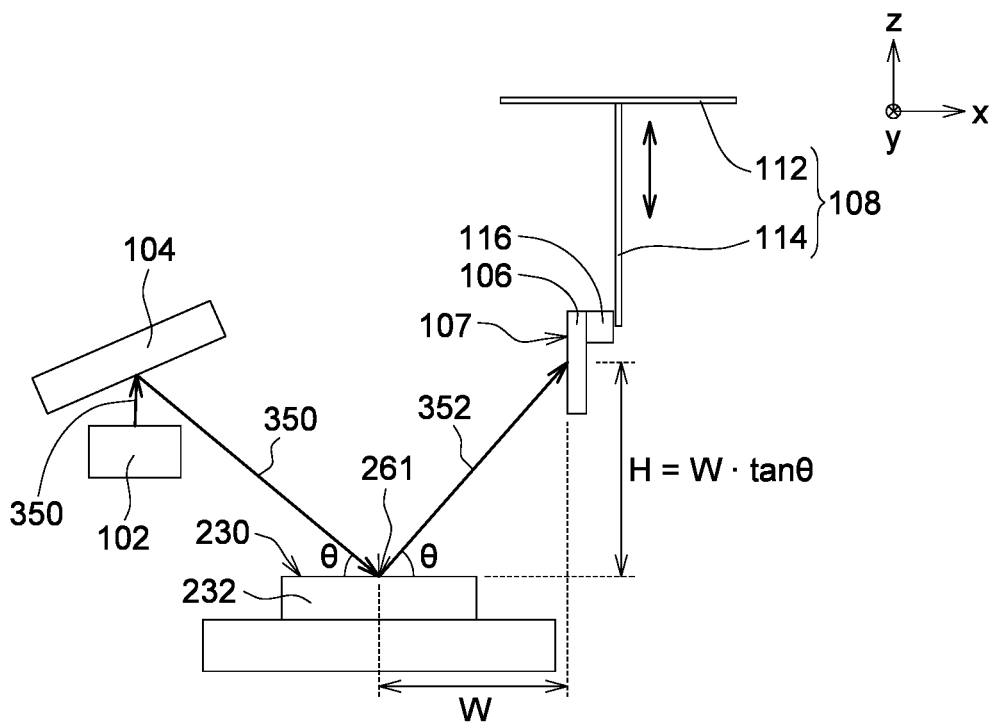
FIG. 2A and FIG. 2B illustrate the X-ray reflectometry apparatus and the method for measuring the three-dimensional nanostructure on the flat substrate according to another embodiment.
Figure 2B:
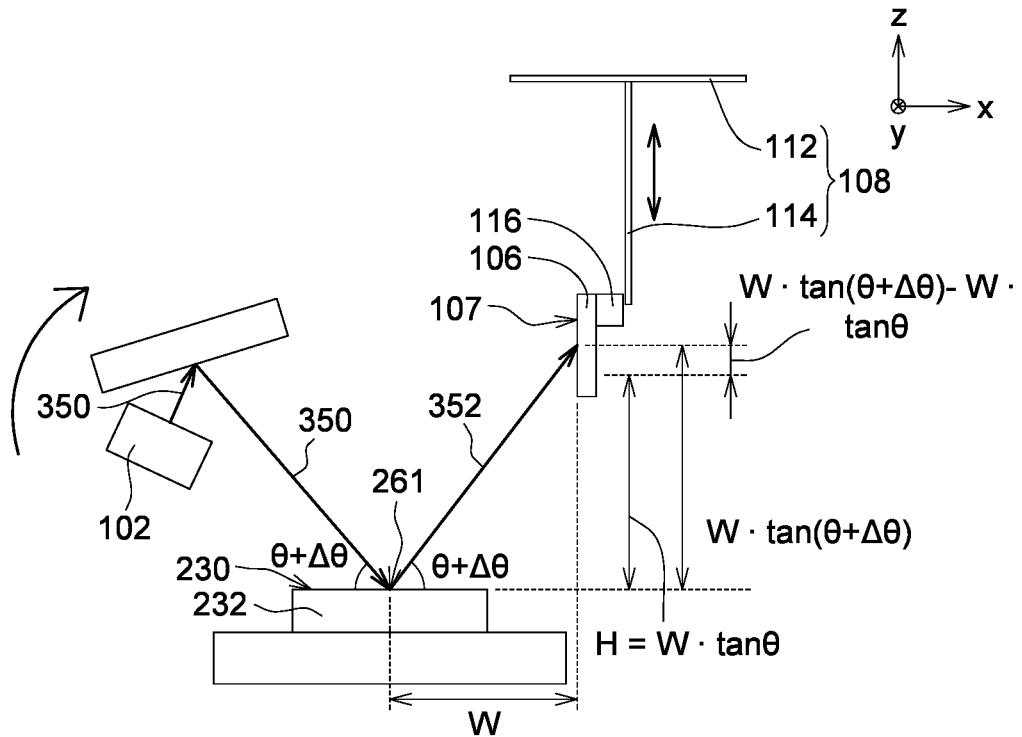

FIG. 2A and FIG. 2B illustrate the X-ray reflectometry apparatus and the method for measuring the three-dimensional nanostructure on the flat substrate according to another embodiment. In the embodiment, the x-axis position of the 2-dimensional X-ray detector 106 may be not moved by fixing the x-axis moving device 112 during the measuring. The distance W between the X ray-reflection point 261 on the sample surface 230 and the surface 107 of the 2-dimensional X-ray detector 106 along the x-axis is constant and not varied during the measuring.

FIG. 2A is referred to. When the incident angle of the X-ray 350 with respect to the sample surface 230 is θ, the z-axis moving device 114 of the two-axis moving device 108 controls the 2-dimensional X-ray detector 106 to move on the z-axis with a formula: H=W·tan θ. By which the reflecting X-ray signal 352 can arrive at the center of the 2-dimensional X-ray detector 106 in the z-axis direction so as to be collected by the 2-dimensional X-ray detector 106. The 2-dimensional X-ray detector 106 still can collect the reflecting X-ray signal 352 with a moving deviation from the center of the 2-dimensional X-ray detector 106 in the z-axis direction being within ±L/2 during the measuring.

FIG. 2B is referred to. When the incident angle of the X-ray 350 with respect to the sample surface 230 is changed from θ(FIG. 2A) to θ+Δθ (FIG. 2B), the z-axis moving device 114 of the two-axis moving device 108 controls the 2-dimensional X-ray detector 106 to move on the z-axis with a formula: H+ΔH=tan(θ+Δθ). In other words, the z-axis moving device 114 controls the 2-dimensional X-ray detector 106 to move with a distance ΔH on the z-axis with a formula: ΔH=W·tan(θ+Δθ)−W·tan θ from the distance H. By which the reflecting X-ray signal 352 can arrive at the center of the 2-dimensional X-ray detector 106 in the z-axis direction so as to be collected by the 2-dimensional X-ray detector 106. The 2-dimensional X-ray detector 106 still can collect the reflecting X-ray signal 352 with a moving deviation from the center of the 2-dimensional X-ray detector 106 in the z-axis direction being within ±L/2 during the measuring.

Figure 3A:
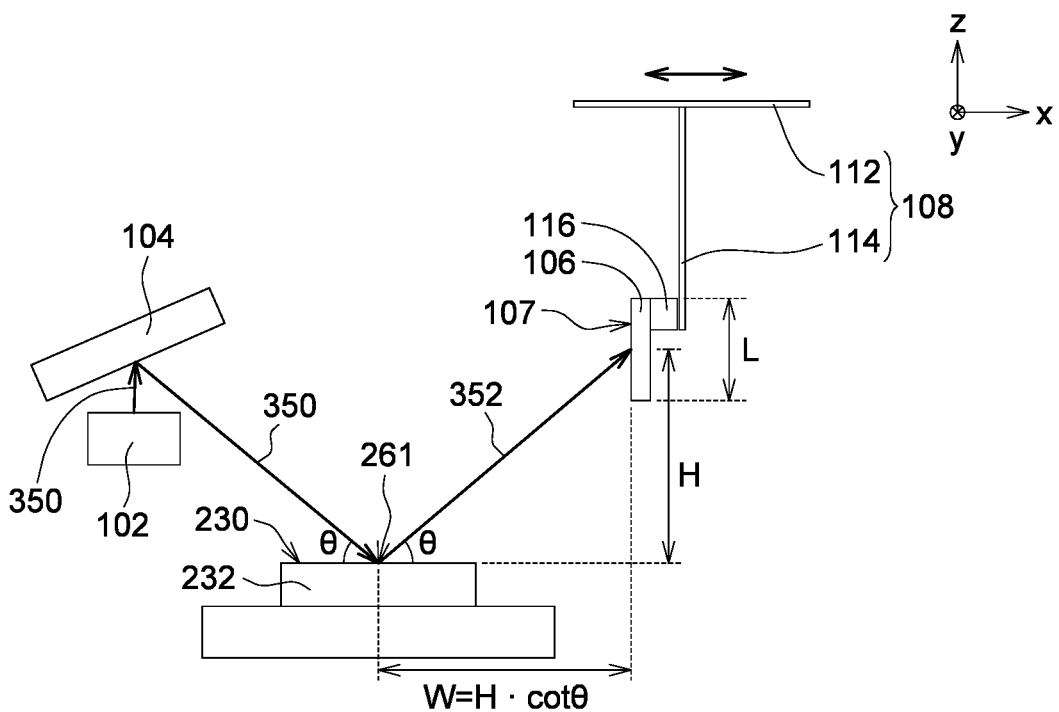
FIG. 3A and FIG. 3F illustrate the X-ray reflectometry apparatus and the method for measuring the three-dimensional nanostructure on the flat substrate according to yet another embodiment.
Figure 3B:
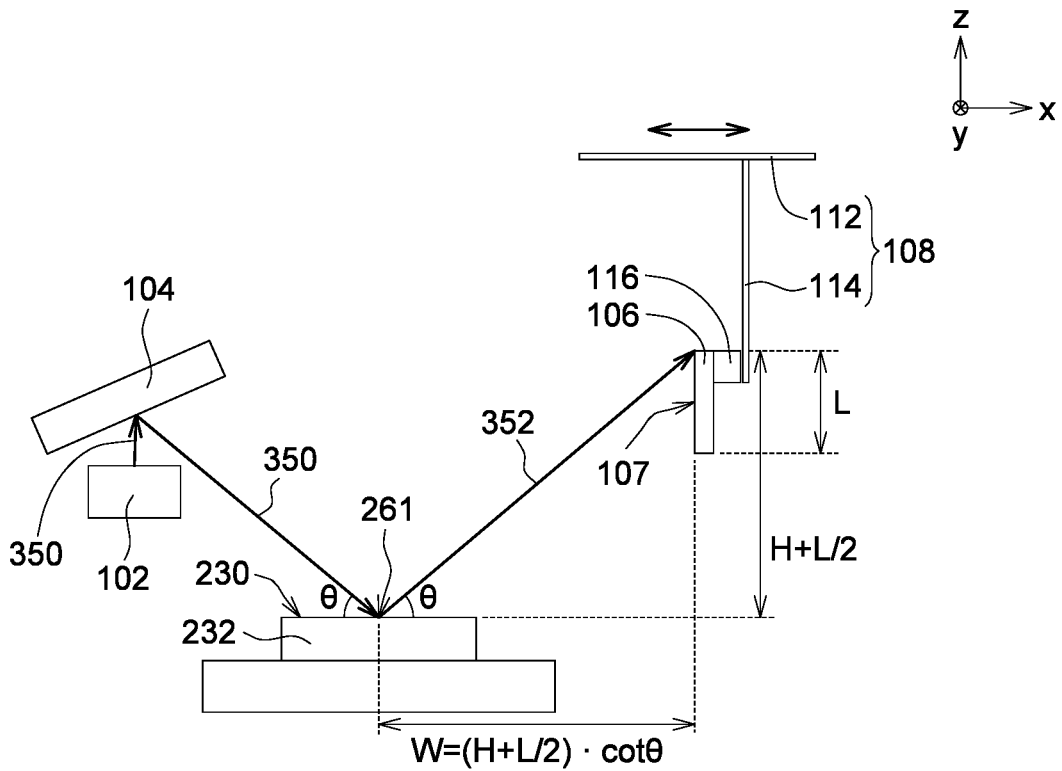
Figure 3C:
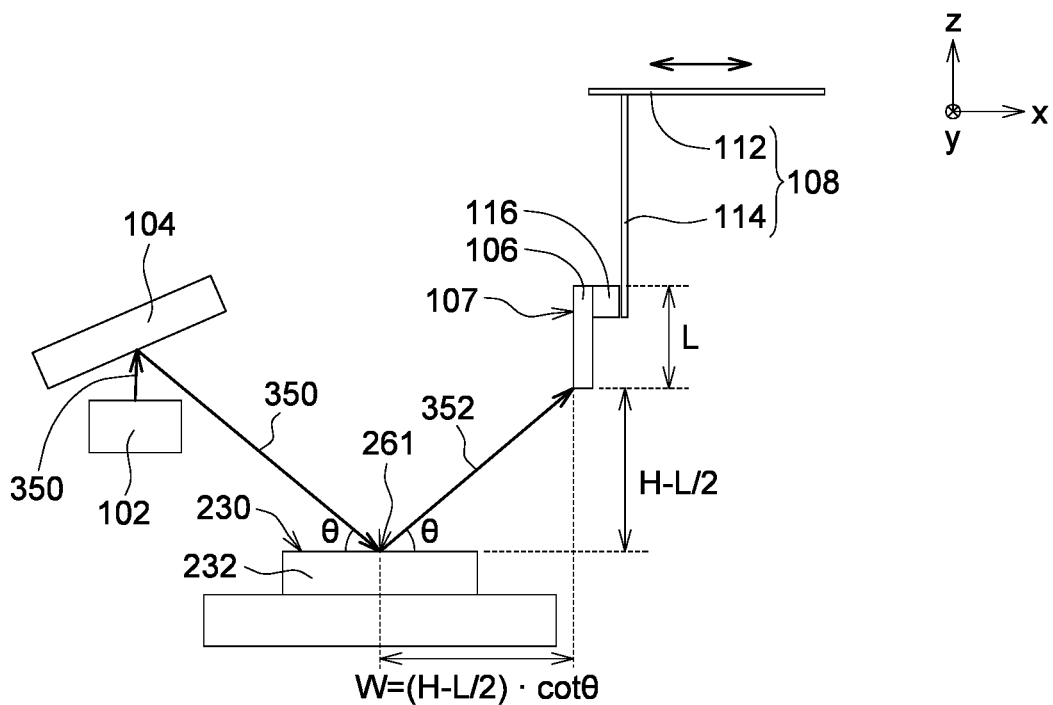
Figure 3D:
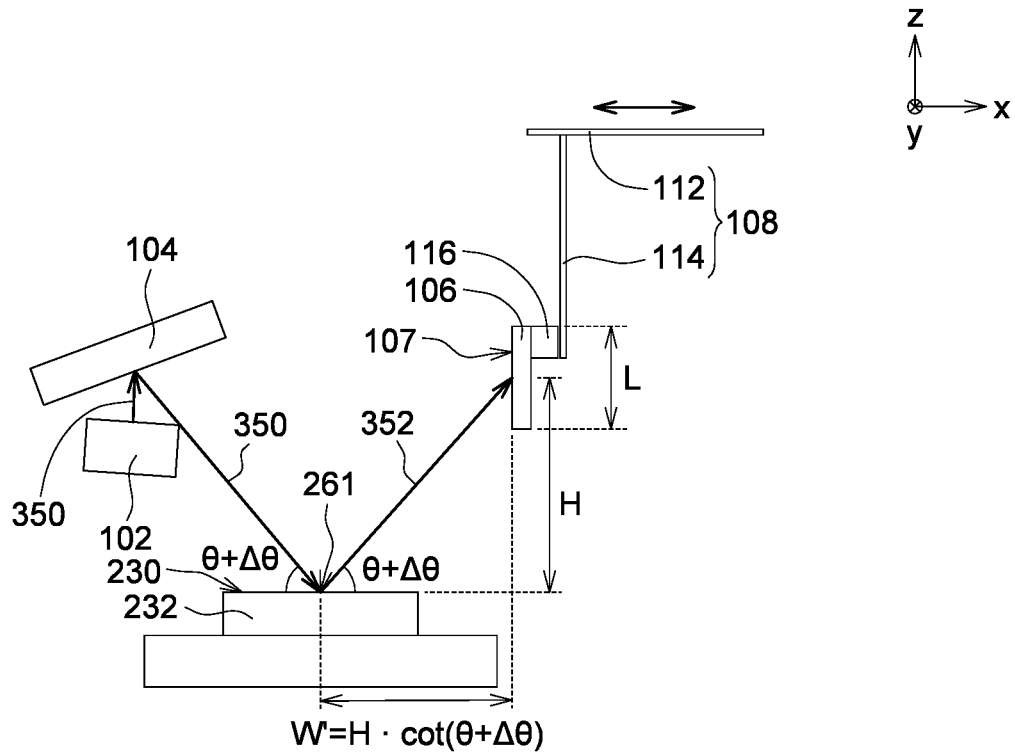
Figure 3E:
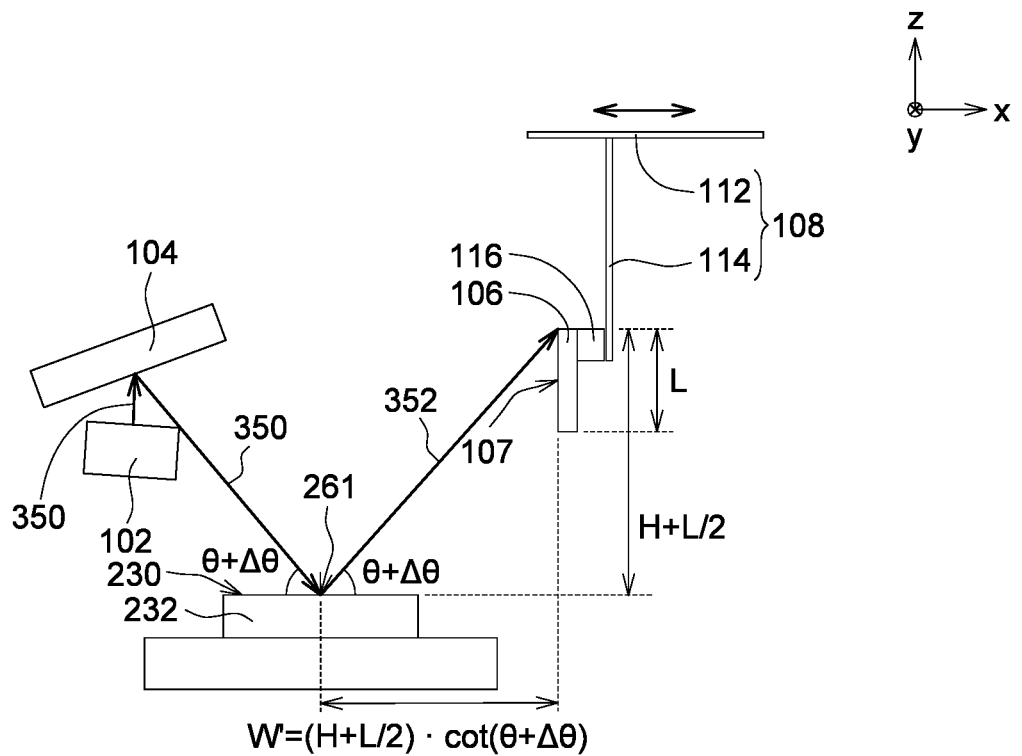
Figure 3F:
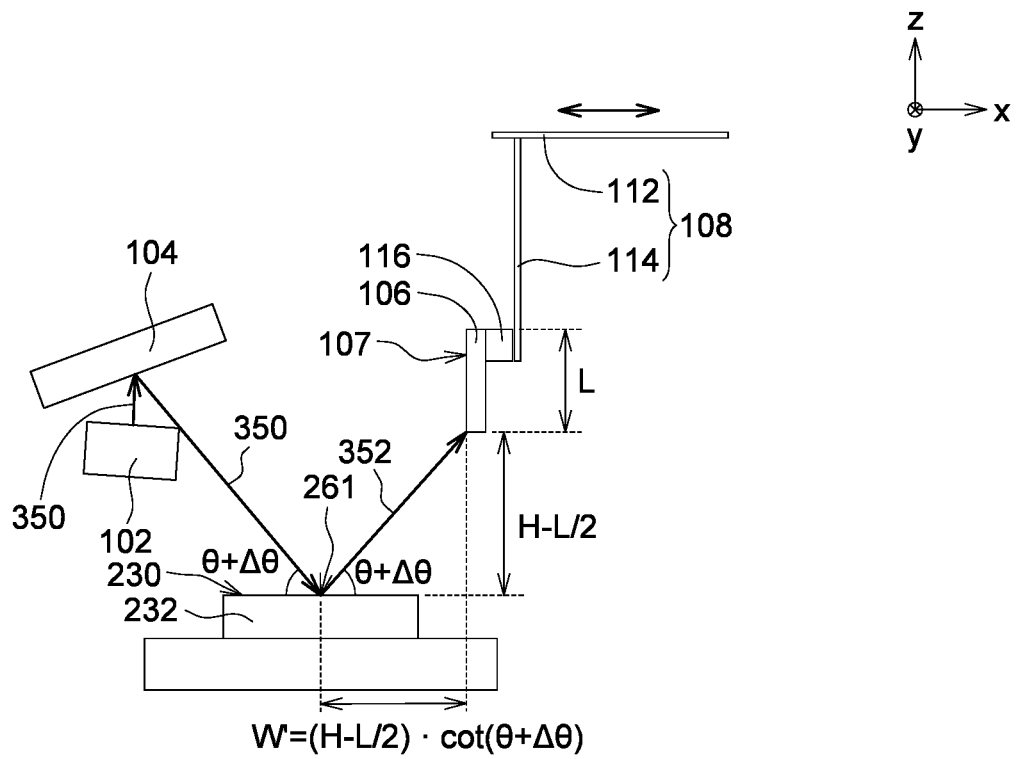

FIG. 3A and FIG. 3F illustrate the X-ray reflectometry apparatus and the method for measuring the three-dimensional nanostructure on the flat substrate according to yet another embodiment. In the embodiment, the z-axis position of the 2-dimensional X-ray detector 106 may be not moved by fixing the z-axis moving device 114 during the measuring. The distance H between the sample surface 230 and the center of the 2-dimensional X-ray detector 106 along the z-axis is constant and not varied during the measuring.

FIG. 3A is referred to. When the incident angle of the X-ray 350 with respect to the sample surface 230 is θ, the x-axis moving device 112 of the two-axis moving device 108 controls the 2-dimensional X-ray detector 106 to move on the x-axis with a formula: W=H·cot θ. By which the reflecting X-ray signal 352 can arrive at the center of the 2-dimensional X-ray detector 106 in the z-axis direction so as to be collected by the 2-dimensional X-ray detector 106. The 2-dimensional X-ray detector 106 still can collect the reflecting X-ray signal 352 within a distance range $$\left(H - \frac{L}{2}\right) \cdot \cot\theta$$

(FIG. 3B) to $$\left(H + \frac{L}{2}\right) \cdot \cot\theta$$

(FIG. 3C) controlled by the x-axis moving device 112 during the measuring.

FIG. 3B is referred to. The formula $$"\left(H + \frac{L}{2}\right) \cdot \cot\theta"$$

is a maximum distance W between the X ray-reflection point 261 on the sample surface 230 and the surface 107 of the 2-dimensional X-ray detector 106 along the x-axis that the reflecting X-ray signal 352 can arrive at the top of the 2-dimensional X-ray detector 106 so as to be collected by the 2-dimensional X-ray detector 106. The distance between the top of the 2-dimensional X-ray detector 106 and the sample surface 230 along the z-axis is equal to H+L/2.

FIG. 3C is referred to. The formula $$"\left(H - \frac{L}{2}\right) \cdot \cot\theta"$$

is a minimum distance W between the X ray-reflection point 261 on the sample surface 230 and the surface 107 of the 2-dimensional X-ray detector 106 along the x-axis that the reflecting X-ray signal 352 can arrive at the bottom of the 2-dimensional X-ray detector 106 so as to be collected by the 2-dimensional X-ray detector 106. The distance between the bottom of the 2-dimensional X-ray detector 106 and the sample surface 230 along the z-axis is equal to H–L/2.

FIG. 3D is referred to. When the incident angle of the X-ray 350 with respect to the sample surface 230 is changed from θ (FIG. 3A) to θ+Δθ (FIG. 3D), the x-axis moving device 112 of the two-axis moving device 108 controls the 2-dimensional X-ray detector 106 to move on the x-axis with a formula: W'=W+ΔW=H·cot (θ+Δθ). In other words, the x-axis moving device 112 controls the 2-dimensional X-ray detector 106 to move with a distance ΔW on the x-axis with a formula: ΔW=H·cot (θ+Δθ)–H·cot θ from the distance W (FIG. 3A). By which the reflecting X-ray signal 352 can arrive at the center of the 2-dimensional X-ray detector 106 in the z-axis direction so as to be collected by the 2-dimensional X-ray detector 106. The 2-dimensional X-ray detector 106 still can collect the reflecting X-ray signal 352 within a distance range from $$\left(H - \frac{L}{2}\right) \cdot \cot(\theta + \Delta\theta)$$

(FIG. 3F) to $$\left(H + \frac{L}{2}\right) \cdot \cot(\theta + \Delta\theta)$$

(FIG. 3E) during the measuring.

FIG. 3E is referred to. The formula $$"\left(H + \frac{L}{2}\right) \cdot \cot(\theta + \Delta\theta)"$$

is a maximum distance W' between the X ray-reflection point 261 on the sample surface 230 and the surface 107 of the 2-dimensional X-ray detector 106 along the x-axis that the reflecting X-ray signal 352 can arrive at the top of the 2-dimensional X-ray detector 106 so as to be collected by the 2-dimensional X-ray detector 106. The distance between the top of the 2-dimensional X-ray detector 106 and the sample surface 230 along the z-axis is equal to H+L/2.

FIG. 3F is referred to. The formula $$"\left(H - \frac{L}{2}\right) \cdot \cot(\theta + \Delta\theta)"$$

is a minimum distance W' between the X ray-reflection point 261 on the sample surface 230 and the surface 107 of the 2-dimensional X-ray detector 106 along the x-axis that the reflecting X-ray signal 352 can arrive at the bottom of the 2-dimensional X-ray detector 106 so as to be collected by the 2-dimensional X-ray detector 106. The distance between the bottom of the 2-dimensional X-ray detector 106 and the sample surface 230 along the z-axis is equal to H–L/2.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An X-ray reflectometry apparatus for measuring a three-dimensional nanostructure on a flat substrate, comprising:
   an X-ray source for emitting X-ray;
   an X-ray reflector configured for reflecting the X-ray onto a sample surface;
   a 2-dimensional X-ray detector configured to collect a reflecting X-ray signal from the sample surface; and
   a two-axis moving device configured to control two-axis directions of the 2-dimensional X-ray detector to move on at least one of x-axis and z-axis with a formula concerning an incident angle of the X-ray with respect to the sample surface for collecting the reflecting X-ray signal.

2. The X-ray reflectometry apparatus according to claim 1, wherein the two-axis moving device comprises an x-axis moving device and a z-axis moving device, wherein the x-axis moving device is configured to control the 2-dimensional X-ray detector to move on the x-axis, the z-axis moving device is configured to control the 2-dimensional X-ray detector to move on the z-axis.

3. The X-ray reflectometry apparatus according to claim 1, further comprising a rotating device configured for rotating the 2-dimensional X-ray detector in x-z plane.

4. The X-ray reflectometry apparatus according to claim 1, wherein when the incident angle of the X-ray with respect to the sample surface is set as a range from θ' to θ'+Δθ, the two-axis moving device controls the 2-dimensional X-ray detector to move on the x-axis with a formula:

$$W < \frac{L}{\tan(\theta' + \Delta\theta) - \tan\theta'},$$

wherein W is a distance between a X ray-reflection point on the sample surface and a surface of the 2-dimensional X-ray detector along the x-axis, L is a size of the 2-dimensional X-ray detector along the z-axis.

5. The X-ray reflectometry apparatus according to claim 1, wherein when the incident angle of the X-ray with respect to the sample surface is set as a range from θ' to θ'+Δθ, the two-axis moving device controls the 2-dimensional X-ray detector to move on the z-axis with a formula: H=W·tan θ'+L/2, wherein W is a distance between a X ray-reflection point on the sample surface and a surface of the 2-dimensional X-ray detector along the x-axis, H is a distance between the sample surface and a center of the 2-dimensional X-ray detector along the z-axis, L is a size of the 2-dimensional X-ray detector along the z-axis.

6. The X-ray reflectometry apparatus according to claim 1, wherein when the incident angle of the X-ray with respect to the sample surface is set as a range from θ' to θ'+Δθ, the two-axis moving device controls the 2-dimensional X-ray detector to move on the x-axis with a formula of $$W < \frac{L}{\tan(\theta' + \Delta\theta) - \tan\theta'},$$

and at the same time move on the z-axis with a formula of H=W·tan θ'+L/2, wherein W is a distance between a X ray-reflection point on the sample surface and a surface of the 2-dimensional X-ray detector along the x-axis, L is a size of the 2-dimensional X-ray detector along the z-axis, H is a distance between the sample surface and a center of the 2-dimensional X-ray detector along the z-axis.

7. The X-ray reflectometry apparatus according to claim 1, wherein when the incident angle of the X-ray with respect to the sample surface is θ, the two-axis moving device controls the 2-dimensional X-ray detector to move on the z-axis with a formula: H=W·tan θ, wherein W is a distance between a X ray-reflection point on the sample surface and a surface of the 2-dimensional X-ray detector along the x-axis, H is a distance between the sample surface and a center of the 2-dimensional X-ray detector along the z-axis.

8. The X-ray reflectometry apparatus according to claim 7, wherein a moving deviation of the 2-dimensional X-ray detector on the z-axis is within ±L/2, wherein L is a size of the 2-dimensional X-ray detector along the z-axis.

9. The X-ray reflectometry apparatus according to claim 7, wherein when the incident angle of the X-ray with respect to the sample surface is changed from θ to θ+Δθ, the two-axis moving device controls the 2-dimensional X-ray detector to move with a distance ΔH on the z-axis with a formula: ΔH=W·tan(θ+Δθ)−W·tan θ.

10. The X-ray reflectometry apparatus according to claim 9, wherein a moving deviation of the 2-dimensional X-ray detector on the z-axis is within ±L/2, wherein L is a size of the 2-dimensional X-ray detector along the z-axis.

11. The X-ray reflectometry apparatus according to claim 1, wherein when the incident angle of the X-ray with respect to the sample surface is set to be θ, the two-axis moving device controls the 2-dimensional X-ray detector to move on the x-axis with a formula: W=H·cot θ, wherein W is a distance between a X ray-reflection point on the sample surface and a surface of the 2-dimensional X-ray detector along the x-axis, H is a distance between the sample surface and a center of the 2-dimensional X-ray detector along the z-axis.

12. The X-ray reflectometry apparatus according to claim 11, wherein when the incident angle of the X-ray with respect to the sample surface is changed from θ to θ+Δθ, the two-axis moving device controls the 2-dimensional X-ray detector to move on the x-axis with a formula: W=H·cot (θ+Δθ).

13. The X-ray reflectometry apparatus according to claim 1, wherein when the incident angle of the X-ray with respect to the sample surface is set to be θ, the two-axis moving device controls the 2-dimensional X-ray detector to move on the x-axis within a distance range from $$(H - \frac{L}{2}) \cdot \cot\theta \text{ to } (H + \frac{L}{2}) \cdot \cot\theta,$$

wherein L is a size of the 2-dimensional X-ray detector along the z-axis, H is a distance between the sample surface and a center of the 2-dimensional X-ray detector along the z-axis, $$(H + \frac{L}{2}) \cdot \cot\theta$$

is a maximum distance between a X ray-reflection point on the sample surface and a surface of the 2-dimensional X-ray detector along the x-axis that the reflecting X-ray signal can arrive at the 2-dimensional X-ray detector, $$(H - \frac{L}{2}) \cdot \cot\theta$$

is a minimum distance between the X ray-reflection point on the sample surface and the surface of the 2-dimensional X-ray detector along the x-axis that the reflecting X-ray signal can arrive at the 2-dimensional X-ray detector.

14. The X-ray reflectometry apparatus according to claim 13, wherein when the incident angle of the X-ray with respect to the sample surface is changed from θ to θ+Δθ, the two-axis moving device controls the 2-dimensional X-ray detector to move on the x-axis within a distance range from $$(H - \frac{L}{2}) \cdot \cot(\theta + \Delta\theta) \text{ to } (H + \frac{L}{2}) \cdot \cot(\theta + \Delta\theta),$$

wherein $$(H + \frac{L}{2}) \cdot \cot(\theta + \Delta\theta)$$

is a maximum distance between a X ray-reflection point on the sample surface and a surface of the 2-dimensional X-ray detector along the x-axis that the reflecting X-ray signal can arrive at the 2-dimensional X-ray detector, $$(H - \frac{L}{2}) \cdot \cot(\theta + \Delta\theta)$$

is a minimum distance between the X ray-reflection point on the sample surface and the surface of the 2-dimensional X-ray detector along the x-axis that the reflecting X-ray signal can arrive at the 2-dimensional X-ray detector.

15. A method for measuring a three-dimensional nanostructure on a flat substrate comprising:
emitting X-ray by an X-ray source;
reflecting the X-ray onto a sample surface by an X-ray reflector;
collecting a reflecting X-ray signal from the sample surface by a 2-dimensional X-ray detector; and
controlling two-axis directions of the 2-dimensional X-ray detector by a two-axis moving device to move on at least one of x-axis and z-axis with a formula concerning an incident angle of the X-ray with respect to the sample surface for collecting the reflecting X-ray signal.

16. The method according to claim 15, wherein the two-axis moving device comprises an x-axis moving device and a z-axis moving device, wherein the x-axis moving device is configured to control the 2-dimensional X-ray detector to move on the x-axis, the z-axis moving device is configured to control the 2-dimensional X-ray detector to move on the z-axis.

17. The method according to claim 15, further comprising rotating the 2-dimensional X-ray detector in x-z plane by a rotating device.

18. The method according to claim 15, wherein when the incident angle of the X-ray with respect to the sample surface is set as a range from θ' to θ'+Δθ, the two-axis moving device controls the 2-dimensional X-ray detector to move on the x-axis with a formula:

$$W < \frac{L}{\tan(\theta' + \Delta\theta) - \tan\theta'},$$

wherein W is a distance between a X ray-reflection point on the sample surface and a surface of the 2-dimensional X-ray detector along the x-axis, L is a size of the 2-dimensional X-ray detector along the z-axis.

19. The method according to claim 15, wherein when the incident angle of the X-ray with respect to the sample surface is set as a range from θ' to θ'+Δθ, the two-axis moving device controls the 2-dimensional X-ray detector to move on the z-axis with a formula: H=W·tan θ'+L/2, wherein W is a distance between a X ray-reflection point on the sample surface and a surface of the 2-dimensional X-ray detector along the x-axis, H is a distance between the sample surface and a center of the 2-dimensional X-ray detector along the z-axis, L is a size of the 2-dimensional X-ray detector along the z-axis.

20. The method according to claim 15, wherein when the incident angle of the X-ray with respect to the sample surface is set as a range from θ' to θ'+Δθ, the two-axis moving device controls the 2-dimensional X-ray detector to move on the x-axis with a formula of $$W < \frac{L}{\tan(\theta' + \Delta\theta) - \tan\theta'},$$

and at the same time move on the z-axis with a formula of H=W·tan θ'+L/2, wherein W is a distance between a X ray-reflection point on the sample surface and a surface of the 2-dimensional X-ray detector along the x-axis, L is a size of the 2-dimensional X-ray detector along the z-axis, H is a distance between the sample surface and a center of the 2-dimensional X-ray detector along the z-axis.

21. The method according to claim 15, wherein when the incident angle of the X-ray with respect to the sample surface is θ, the two-axis moving device controls the 2-dimensional X-ray detector to move on the z-axis with a formula: H=W·tan θ, wherein W is a distance between a X ray-reflection point on the sample surface and a surface of the 2-dimensional X-ray detector along the x-axis, H is a distance between the sample surface and a center of the 2-dimensional X-ray detector along the z-axis.

22. The method according to claim 21, wherein a moving deviation of the 2-dimensional X-ray detector on the z-axis is within ±L/2, wherein L is a size of the 2-dimensional X-ray detector along the z-axis.

23. The method according to claim 21, wherein when the incident angle of the X-ray with respect to the sample surface is changed from θ to θ+Δθ, the two-axis moving device controls the 2-dimensional X-ray detector to move with a distance ΔH on the z-axis with a formula: ΔH=W·tan (θ+Δθ)−W·tan θ.

24. The method according to claim 23, wherein a moving deviation of the 2-dimensional X-ray detector on the z-axis is within ±L/2, wherein L is a size of the 2-dimensional X-ray detector along the z-axis.

25. The method according to claim 15, wherein when the incident angle of the X-ray with respect to the sample surface is set to be θ, the two-axis moving device controls the 2-dimensional X-ray detector to move on the x-axis with a formula: W=H·cot θ, wherein W is a distance between a X ray-reflection point on the sample surface and a surface of the 2-dimensional X-ray detector along the x-axis, H is a distance between the sample surface and a center of the 2-dimensional X-ray detector along the z-axis.

26. The method according to claim 25, wherein when the incident angle of the X-ray with respect to the sample surface is changed from θ to θ+Δθ, the two-axis moving device controls the 2-dimensional X-ray detector to move on the x-axis with a formula: W=H·cot (θ+Δθ).

27. The method according to claim 15, wherein when the incident angle of the X-ray with respect to the sample surface is set to be θ, the two-axis moving device controls the 2-dimensional X-ray detector to move on the x-axis within a distance range from $$(H - \frac{L}{2}) \cdot \cot\theta \text{ to } (H + \frac{L}{2}) \cdot \cot\theta,$$

wherein L is a size of the 2-dimensional X-ray detector along the z-axis, H is a distance between the sample surface and a center of the 2-dimensional X-ray detector along the z-axis, $$(H + \frac{L}{2}) \cdot \cot\theta$$

is a maximum distance between a X ray-reflection point on the sample surface and a surface of the 2-dimensional X-ray detector along the x-axis that the reflecting X-ray signal can arrive at the 2-dimensional X-ray detector, $$(H - \frac{L}{2}) \cdot \cot\theta$$

is a minimum distance between the X ray-reflection point on the sample surface and the surface of the 2-dimensional X-ray detector along the x-axis that the reflecting X-ray signal can arrive at the 2-dimensional X-ray detector.

28. The method according to claim 27, wherein when the incident angle of the X-ray with respect to the sample surface is changed from θ to θ+Δθ, the two-axis moving device controls the 2-dimensional X-ray detector to move on the x-axis within a distance range from $$(H - \frac{L}{2}) \cdot \cot(\theta + \Delta\theta) \text{ to } (H + \frac{L}{2}) \cdot \cot(\theta + \Delta\theta),$$

wherein $$(H + \frac{L}{2}) \cdot \cot(\theta + \Delta\theta)$$

is a maximum distance between a X ray-reflection point on the sample surface and a surface of the 2-dimensional X-ray detector along the x-axis that the reflecting X-ray signal can arrive at the 2-dimensional X-ray detector, $$(H - \frac{L}{2}) \cdot \cot(\theta + \Delta\theta)$$

is a minimum distance between the X ray-reflection point on the sample surface and the surface of the 2-dimensional X-ray detector along the x-axis that the reflecting X-ray signal can arrive at the 2-dimensional X-ray detector.

* * * * *